March 17, 1959 R. W. SCHARES Re. 24,621

DISPENSING CONTAINER FOR SUPPORT UPON AN EDGE OF A RECEPTACLE

Original Filed Dec. 30, 1952

INVENTOR.
ROGER W. SCHARES
BY
McMorrow, Berman & Davidson
ATTORNEYS

United States Patent Office

Re. 24,621
Reissued Mar. 17, 1959

24,621

DISPENSING CONTAINER FOR SUPPORT UPON AN EDGE OF A RECEPTACLE

Roger W. Schares, New Hampton, Iowa

Original No. 2,736,657, dated February 28, 1956, Serial No. 328,585, December 30, 1952. Application for reissue February 24, 1958, Serial No. 717,283

8 Claims. (Cl. 99—171)

Matter enclosed in heavy brackets [ ] appears in the original patent but forms no part of this reissue specification; matter printed in italics indicates the additions made by reissue.

This invention relates to a device adapted to hold a quantity of juice, such as lemon, orange, or lime juice, or any other liquid, the article consituting the present invention being adapted, in one possible commericial embodiment thereof, to simulate a fruit slice and being adapted for dispensing of the juice or any other liquid contained therein.

It is one important object to provide a device of the type stated which can be substituted for the conventional slice of fresh lemon, orange, or lime used to flavor beverages and foods.

It is another important object to provide an artificial food slice adapted to contain a quantity of juice to be dispensed, said slice further including a mixer stick capable of being separated from the slice to permit dispensing of the juice and to facilitate stirring of a beverage.

Another object is to provide a dispensing device which can be used for the dispensing of any of varoius liquids, such as hand lotions, cosmetics, condiments, water purifiers such as chlorine, etc.

Another object of importance is to provide a juice dispensing device in the form of an artificial fruit slice, the slice having a slotted portion adapting the same for support upon the rim of a glass or equivalent container, the slotted portion providing means adapted to be broken off to form a dispensing opening through which the fruit juices may be expelled.

Yet another object is to provide a dispensing device in the form of an artificial slice of fruit, which device can be formed from plastic material or the like, a portion of the plastic material being compressible to effect the dispensing of the juice ordinarily sealed within the slice.

Other objects will appear from the following description, the claims appended thereto, and from the annexed drawing, in which like reference characters designate like parts throughout the several views, and wherein:

Figure 1:
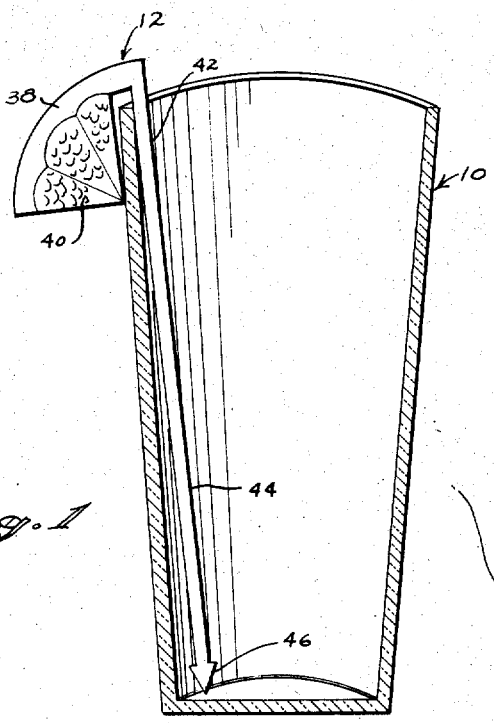
Figure 1 is a longitudinal sectional view through a beverage glass, showing in side elevation one form of the present invention, as it appears when mounted upon said glass.
Figure 5:
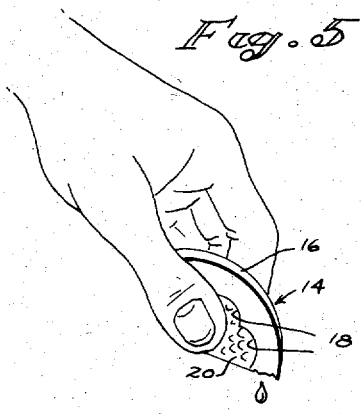
Figure 5 is a fragmentary perspective view showing the dispensing device as it appears when in use.

Referring to the drawings in detail, the reference numeral 10 has been applied generally to a beverage glass, in association with which the invention can be used. The reference numeral 12 has been applied generally to one form of dispensing device formed in accordance with the present invention, while the reference numeral 14 has been applied generally, in Figures 2 to 5 inclusive, to designate another form of the invention.

Considering the form of the invention shown in Figures 2 to 5 inclusive, the device [can be] *is preferably* molded in its entirety from plastic material or the like, said material being molded to an external configuration that will simulate closely the shape of a slice of lemon, orange, lime or other fruit from which juice can be squeezed. Additionally, it may be noted at this point that the plastic material of which the dispensing device would be formed, will, in commercial embodiments of the invention, be compounded of colored pigments, that will add to the faithfulness of the simulation. Thus, if the dispensing device is formed to simulate a slice of lime, the device would be green in color. Similarly, the device would be yellow if it is to simulate a slice of lemon, and orange, if it is to simulate a slice of orange.

In any event, the dispensing device constituting the present invention is relatively flat, and has an arcuate back piece 16, extending through substantially ninety degrees of a circle, thus to simulate a quarter slice of fruit.

The arcuate back piece 16 has an inner edge formed with a series of longitudinal depressions 18, said depressions 18 simulating the segments of the fruit slice.

[Cemented or otherwise permanently attached to the inner edge of the back piece 16 is a flexible envelope 20, said envelope being formed of a relatively firm, deformable plastic material externally colored and grained to simulate the juice-bearing portion of the fruit slice. The envelope would be sufficiently pliable to permit juice to be squeezed readily therefrom. The envelope 20 has edges] *The body portion 20 of member 14 defined by the edges 22 and 24 and the respective ends of the inner edge of back 16 outlining the depressions 18 is preferably of rigid material the same as back 16, and either such back or body portion 20 is provided with a channeled or hollowed out area so as to serve as a reservoir, chamber or receptacle for holding juice or other material to be dispensed, and portion 20 may also be provided with a cavity defined by relatively firm deformable plastic sufficiently pliable to permit juice or the like to be squeezed readily therefrom. The rigid hollowed out embodiment, would, I believe, be preferred in commercial use. Edges* 22 *and* 24 *are* disposed at right angles to one another, *with* the free end of the edge 22 abutting and secured to the adjacent one end of the back piece 16, *and* with a free end of the edge 24 being inwardly of and spaced from the other end or the back piece 16. Exteriorly, the spaced portions of the segmentally shaped [envelope] *body portion 20* may have radial lines 26 impressed therein, said lines simulating the divisions of the slice of fruit.

Contained within the [deformable envelope] *body portion 20* is a supply of juice J. The juice J would be lemon juice, orange juice or lime juice, it being common practice in the art to sell said juices in concentrated or unconcentrated form, sealed in suitable containers.

[The back piece 16 could be channeled or hollowed out so as to hold juice. This construction would, in fact, be preferred in commercial embodiments of the invention, I believe.]

In filling the [envelope,] *body portion 20* [it would be possible to accomplish the envelope filling in any of various ways. For example,] a small needle might be injected to insert the juice under pressure, after which the opening made by the needle could be fused shut. [Alternately, the envelope could be partially attached to the rigid back piece 16, with a portion of the envelope being left open. Thereafter, the envelope could be filled, and the open portion sealed to the back piece.]

Arranged exteriorly of and in parallel spaced relation with respect to the edge 24 of the [envelope] *body portion* 20 is an arm 28 of rigid material, one end of the arm 28 abutting and being secured to the other end 32 of the back piece 16. The space 30 between the arm 28 and the edge 24 of the [envelope] *body portion* 20 is adapted to receive the rim of a beverage glass, thus to cause the artificial fruit slice to be supported upon the beverage glass in the usual manner presently practiced when real fruit juices are served with beverages. Projecting perpendicularly from the inner face of the arm 28 adjacent the one end secured to the other end of the back piece 16 is a frangible strip 34 which has its free end abutting and secured to the free end of the edge 24 of the [envelope] *body portion* 20. The space 36 between the strip 34 and the other end 32 of the back piece 16 [forms] *is in communication with the chambered area of body portion 20 forming* a dispensing opening when the frangible strip is broken away from the edge 24 of the envelope 20 and the arm 28 is swung from its parallel position with respect to the edge 24 of the [envelope] *body portion* 20 to an extended position wholly away from such edge, as illustrated by the dotted lines in Figure 4.

In use of a dispensing device formed as shown in Figures 2 to 5, the artificial fruit slice would ordinarily be served upon the beverage glass. Subsequently, when it is desired to dispense the juice J, the arm 28 would be grasped, and pulled outwardly to the dotted line position shown in Figure 4. This would cause the arm 28 to break off from the back piece 16, exposing the dispensing opening 36. Thereafter, the slice is grasped *and tilted* in the manner shown in Figure 5 [, and the opposite sides of the envelope 20 are squeezed]. This causes the juice *or contents of portion 20* to be dispensed through the opening, into the beverage glass *with such contents being poured or shaken out of member 14 when body portion 20 is rigidly formed as described, or being squeezed out if a deformable material is used as indicated.*

[Except for the relatively firm but pliable envelope, the entire device is made of a single piece of hard plastic material.]

Figure 2:
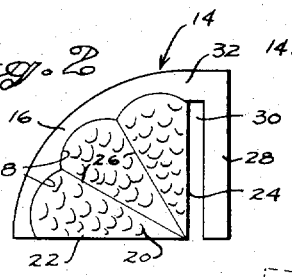
Figure 2 is a side elevational view of a second form of the invention.
Figure 3:
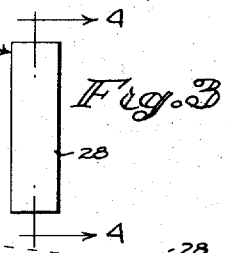
Figure 3 is an edge elevational view of the dispensing device shown in Figure 2, as it appears when viewed from the right of Figure 2.
Figure 4:
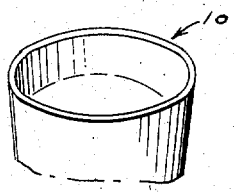
Figure 4 is an enlarged sectional view taken substantially on line 4—4 of Figure 3, the dotted lines indicating a position to which a frangible portion of the device is moved preliminary to dispensing of the juices.
Figure 4:
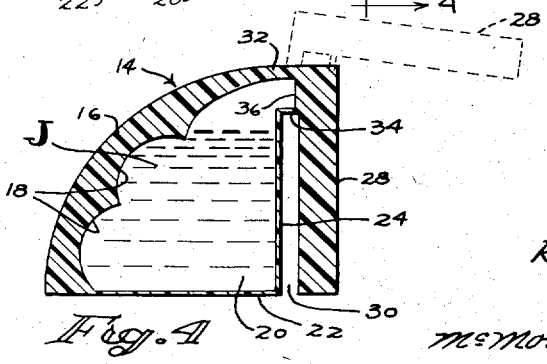

In Figure 1, there has been illustrated a modified form *having the back piece 38 and body portion 40 corresponding in structure, shape and use to the back piece 16 and body portion 20 in Figure 2* [wherein the back piece 38 has an envelope 40 secured thereto, the back piece and envelope corresponding to the back piece and envelope of Figure 2].

Rigid with one end of the back piece 38 is an arm 42 analogous to the arm 28. However, in the form of the invention shown in Figure 1, the arm 42 has an elongated extension 44 provided at its free end with a point 46. The arm is thus fashioned as a mixing stick, *or stirring member,* which, [after being] *can be* broken off from the back piece 38, *to form a dispensing opening as described above and which* can be used in stirring a beverage *both before and after being thus separated.*

The device, it is believed, has certain advantages over ordinary, fresh fruit slices. For example, the device is clean and sanitary, and furnishes accurate portion control. Additionally, the device permits elimination or substantial reduction of the amount of labor involved in cutting and preparing fresh fruit slices.

Still further, the device has an advantage so far as producers are concerned, since juice from windfall fruits can be used effectively, in the artificial fruit slices.

Although the invention has been illustrated and described as a simulated slice of fruit from which fruit juice can be dispensed, it could have other forms, the showing of a fruit slice being merely illustrative and not necessarily restrictive. Further, any liquid, whether it be fruit juice or some other liquid, can be dispensed therefrom.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. A juice dispensing device comprising a rigid back *having an integral hollow body portion,* [piece, an envelope secured to said back piece,] the back [piece] and *body portion* [envelope] being formed to simulate a fruit slice, the *body portion* [envelope] being formed of a deformable material to permit dispensing of a fruit juice contained therein responsive to squeezing of the *body portion* [envelope], an arm arranged exteriorly of and in parallel spaced relation with respect to one of the edges of said *body portion* [envelope] and having one end rigidly secured to the adjacent end of said back [piece], a space between said arm and edge of said *body portion* [envelope] being adapted to receive the rim of a beverage glass, and a frangible strip projecting perpendicularly from the inner face of said arm and having its free end abutting and secured to said edge of said *body portion* [envelope], the space between said strip and the end of said back piece connected to said arm forming a dispensing opening when the frangible strip is broken away from said edge of said *body portion* [envelope] and the arm has been swung away from its parallel position.

2. A juice dispensing device comprising a rigid back, *having an integral hollow body portion,* [an envelope facing said back,] said back [piece] and *body portion* [envelope] being formed to simulate a fruit slice, the *body portion* [envelope] being formed of a deformable material to permit dispensing of a fruit juice contained therein responsive to squeezing of the *body portion* [envelope] and having edges disposed at right angles with respect to each other with the free end if one of the edges abutting and secured to the adjacent one end of said back [piece] and with the free end of the other of the edges being inwardly of and spaced from the other end of the back [piece], an arm arranged exteriorly of and in parallel spaced relation with respect to the other edge of said *body portion* [envelope] and having one end rigidly secured to the other end of said back [piece], a space between said arm and the other edge of said *body portion* [envelope] being adapted to receive the rim of a beverage glass, and a frangible strip projection perpendicularly from the inner face of said arm and having its free end abutting and secured to the free end of the other edge of said *body portion* [envelope], the space between said strip and the other end of said back [piece] forming a dispensing opening when the frangible strip is broken away from the other edge of said *body portion* [envelope] and the arm has been swung away from its parallel position.

3. A juice dispensing device comprising a rigid back, *having an integral hollow body portion,* [an envelope facing said back,] said back [piece] and *body portion* [envelope] being formed to simulate a fruit slice, the *body portion* [envelope] being formed of deformable material to permit dispensing of a fruit juice contained therein responsive to squeezing of the *body portion* [envelope] and having edges disposed at right angles with respect to each other with the free end of one of the edges abutting and secured to the adjacent one end of said back [piece] and with the free end of the other of the edges being inwardly of and spaced from the other end of the back [piece], an arm arranged exteriorly of and in parallel spaced relation with respect to the other edge of said *body portion* [envelope] being adapted to receive the rim of a beverage glass, and a frangible strip projecting perpendicularly from the inner face of said arm and having its free end abutting and secured to the free end of the other edge of said *body portion* [envelope], the space between said strip and the other end of said back [piece] forming a dispensing opening when the frangible strip is broken away from the other edge of said *body portion* [envelope] and the arm has been swung away from its parallel position, said arm including an elongated extension extendible into said beverage glass to provide a mixing stick.

*4. A dispensing device, comprising a chambered body member, an arm separably connected at one end to said body member and extending first perpendicularly from one edge thereof and then parallel thereto in spaced relationship to define a means by which said body member can be removably hooked onto the rim of a beverage glass, on the perpendicular extension of said arm and said end of said arm connected to said body member serving as a closure for the chamber in said body member and being separable therefrom to form a dispensing opening therein.*

*5. A juice dispensing device, comprising a body member in a form simulating a fruit slice and provided with a chamber, an arm arranged exteriorly of and in parallel spaced relationship with respect to one of the edges of said body member, a frangible strip disposed transversely of the adjacent edges of said body member and said arm and integral therewith, said frangible strip adapted to rest on the rim of a beverage glass with said body member and said arm suspended on respective opposite sides of the rim, one end of said frangible member serving as a closure for said chamber in said body member and forming a dispensing opening therein when broken away from said body member.*

*6. A dispensing device, comprising a body having a chamber, a frangible strip integral with and projecting from said body and serving as a closure for said chamber, an arm integral with the projected end of said frangible strip and disposed in parallel spaced relationship to one edge of said body, said frangible strip adapted to rest on the rim of a beverage glass so that said arm is suspended within the glass and said body is suspended on the outer side of said glass, and said frangible strip separable from said body to provide a dispensing opening in said chamber.*

*7. A dispensing device, comprising a chambered body having at least one straight edge, an arm in parallel spaced relationship to said straight edge, a frangible strip connecting one end of said arm to said body and serving as a closure for said chamber, said body adapted to be supported on a beverage glass prior to use by placing the rim of the glass in the space between the body and arm so that said frangible strip rests on the top of the rim, and said frangible strip separable from said body to provide a dispensing opening in said chamber.*

*8. A dispensing device, comprising a body having a chamber, a frangible strip integral with and projecting from said body and serving as a closure for said chamber, an elongated arm integral with the projected end of said frangible strip and disposed in parallel spaced relationship to one edge of said body, said frangible strip adapted to rest on the rim of a beverage glass so that said arm is suspended within the glass and said body is suspended on the outer side of said glass, said frangible strip separable from said body to provide a dispensing opening in said chamber, and said arm designed to be extendible sufficiently into the glass to serve as a mixing means for the contents thereof.*

References Cited in the file of this patent or the original patent

UNITED STATES PATENTS

| | | |
|---|---|---|
| 634,349 | Humphrey | Oct. 3, 1899 |
| 2,103,389 | Salfisberg | Dec. 28, 1937 |
| 2,134,489 | Scherer | Oct. 25, 1938 |
| 2,334,600 | Boysen | Nov. 16, 1943 |
| 2,597,468 | Garrett | May 20, 1952 |
| 2,606,836 | McCabe | Aug. 12, 1952 |

FOREIGN PATENTS

| | | |
|---|---|---|
| 11,830 of 1928 | Australia | Feb. 20, 1928 |